United States Patent Office 3,528,712
Patented Sept. 15, 1970

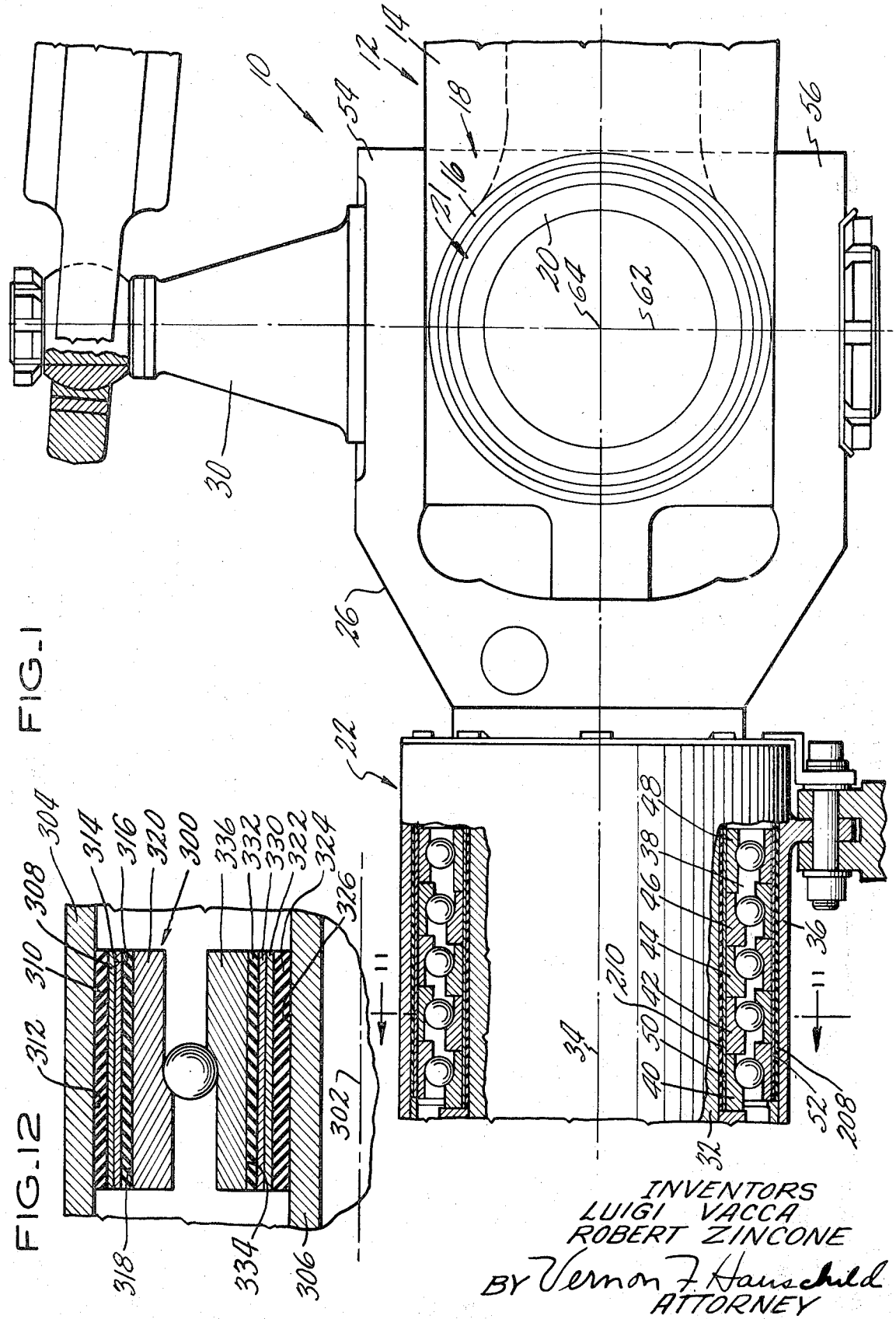

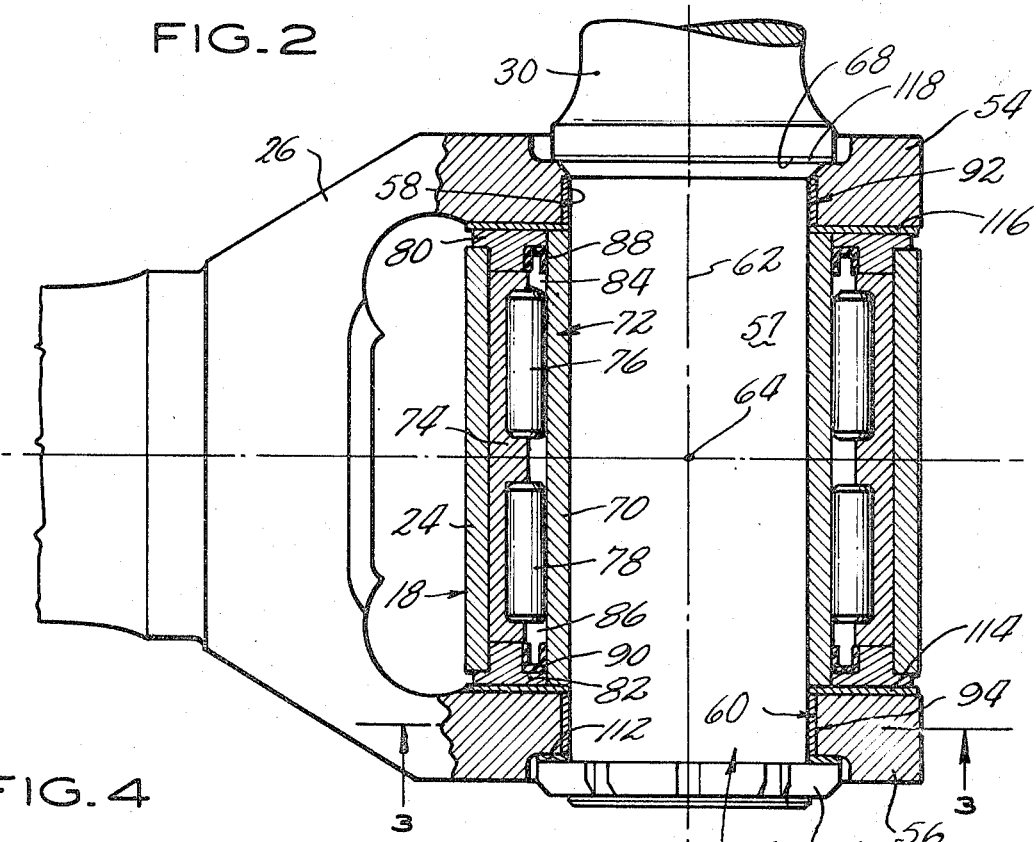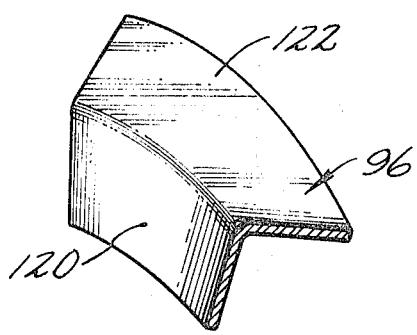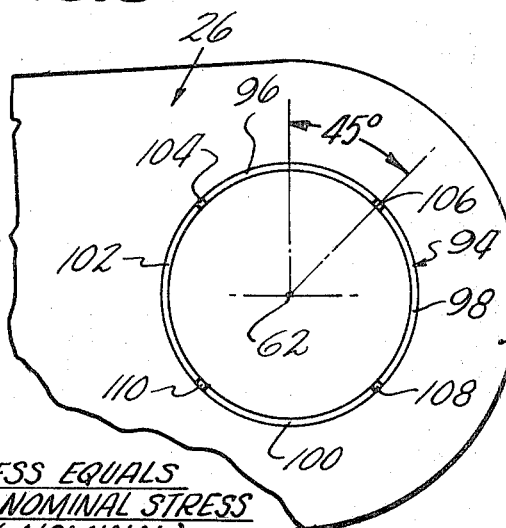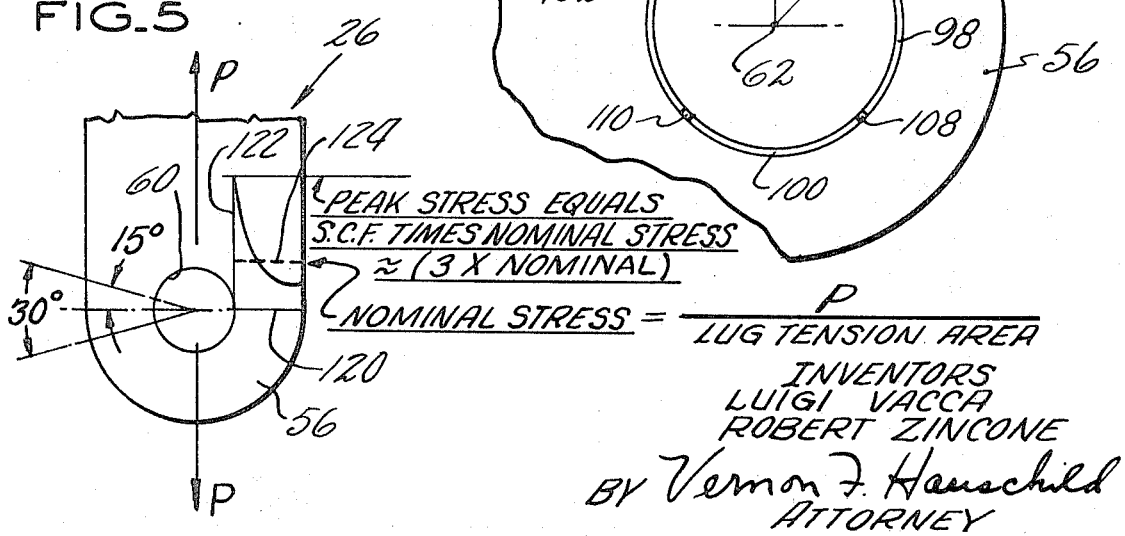

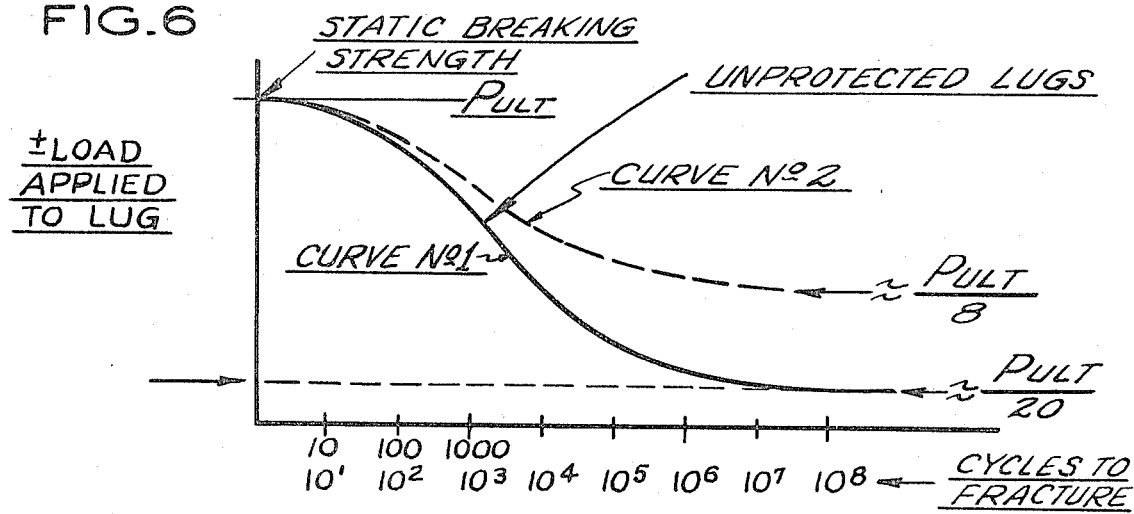
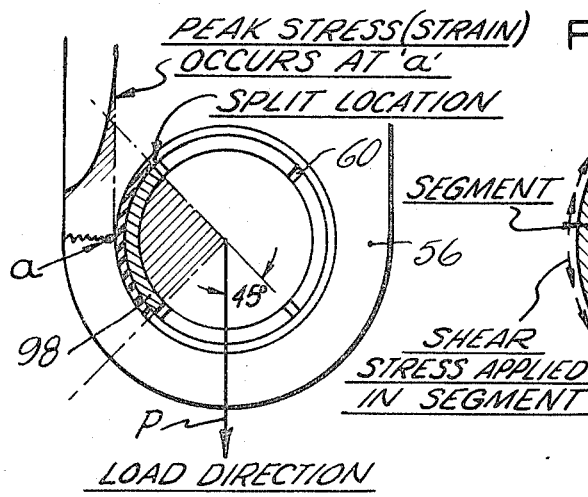
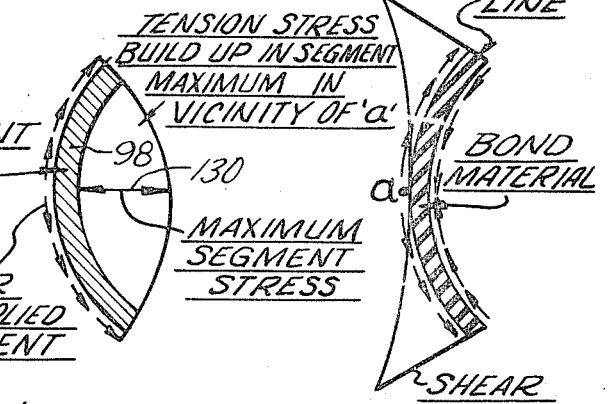
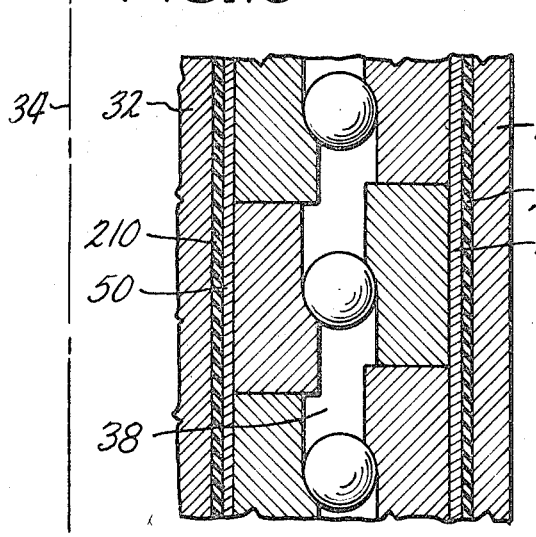
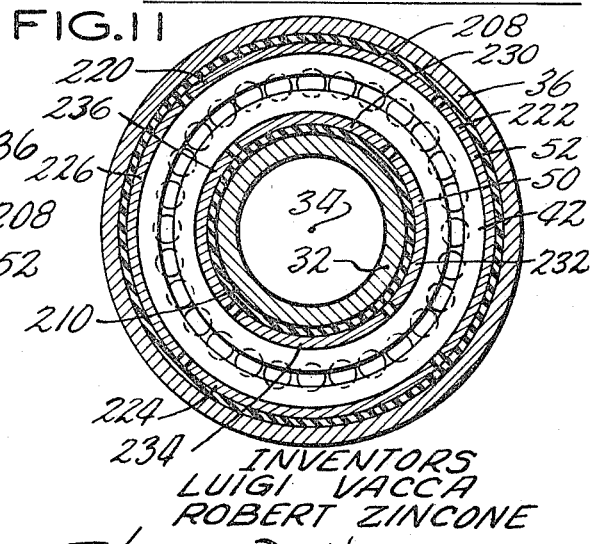

3,528,712
BEARING MEANS FOR ABATING FRETTING DAMAGE
Luigi Vacca, Milford, and Robert Zincone, Stamford, Conn., assignors to United Aircraft Corporation, East Hartford, Conn., a corporation of Delaware
Filed July 31, 1967, Ser. No. 657,409
Int. Cl. F16c 27/00
U.S. Cl. 308—26                         8 Claims

ABSTRACT OF THE DISCLOSURE

Mating structural parts which would otherwise be damaged by fretting action therebetween are joined and supported with respect to one another by a segmented, sacrificial bushing or bearing which is supported from one of the parts by a resilient bonding compound and which engages the other part in mating relation so that all loads and vibrations transmitted between the structural parts are transmitted through this resiliently mounted sacrificial bushing and so that the sole metal-to-metal interface is between the sacrificial bearing and the part with which it mates.

---

The invention herein described was made in the course of or under a contract or subcontract thereunder with the Department of the Navy.

BACKGROUND OF THE INVENTION

This invention relates to apparatus and method for abating fatigue strength reduction in mating, load-carrying, structural parts which are subjected to dynamic vibration so as to cause fretting and fretting corrosion therebetween and more particularly to the use of a sacrificial segmented or split bushing or bearing between said parts and which bearing or bushing bears against one of the structural parts while being bonded directly to the other of the structural parts by a flexible bonding material.

Fretting is generally caused by elastic deformation of the material under dynamic conditions when in contact with another material.

In the helicopter rotor art, and in many other arts, structural mating parts are subjected to a spectrum of frequencies of loading that accumulate total cycle lives exceeding $10^7$ cycles. Fretting corrosion is created between these mating structural parts, thereby reducing the fatigue strength of the parts. This reduction in fatigue strength is highly undesirable because the structural parts must be made heavier to provide them with desired fatigue strength. While this fretting corrosion may be prevented, at least in part, when the parts involved are made of steel by cold working or plating the mating surfaces of the structural parts, there is no known surface protection process for some of the exotic modern materials, such as titanium, which completely eliminates the lowering of the fatigue strength of these metals due to fretting. Titanium and other exotic materials can be cold worked and plated, however, cold working does not preclude loss of critical dimensions and plating in general reduces the fatigue strength of the parent material. Since there are strength-to-weight advantages to be gained by fabricating structural parts of titanium and other metals for which such anti-fretting corrosion protection has not yet been devised, the advantages of these otherwise desirable metals cannot be realized without running the risk of encountering fretting corrosion problems. Fretting corrosion acts in conjunction with geometric stress concentration factors (SCF) and can result in stress concentration factors as high as 10. For example, as shown in FIG. 5, the hole will produce a geometrical stress concentration factor (SCF) of approximately 3. Additionally, in the 30° zone, fretting can be expected and produces an additional SCF of greater than 3 resulting in a total SCF of 10. In addition to fatigue strength degradation, fretting corrosion also causes the scrappage of expensive hardware because of changes in critical dimensions due to surface material loss. Several different methods have been attempted to regain the non-fretted fatigue strength of the structural parts involved, such as cold working the friction surface to produce a compressive stress in the surface layer, or electrolytically plating a superior fretting retardant on the friction surface, or lubricating the friction surfaces to form a protective hydrostatic film therebetween or using high clamping pressures to connect the parts and thereby preclude fretting motion. All of these remedies, when used either singly or in combination, have not been successful in restoring the full material fatigue strength allowance. This failure is primarily due to the fact that none of these remedies permit the complete isolation of the stressed surface layers from the microscopic plowing of the contact or bearing surfaces of the structural parts. Since there are no known practical methods of restoring fatigue strength to the fretting corroded structural parts, it became necessary to investigate solutions to the problem of preventing fretting corrosion.

In investigating ways to prevent fretting between mating structural parts fabricated from the modern high strength-to-weight ratio materials such as titanium we considered cold working the bearing surfaces of the structural parts by both burnishing and shotpeening these parts; however, these procedures were deemed to be inadequate because they do not prevent surface damage and do not preclude loss of critical dimension.

An additional method available to increase the fatigue strength is to overload the structure so as to develop a compressive residual stress in the tension yielded areas. This method was not investigated because it was not applicable to the parts involved and, furthermore, does not prevent surface damage.

We then decided to investigate the problem of preventing fretting between these structural parts. The use of a sacrificial bushing or bearing directly between the mating surfaces of the structural parts was determined to be unsatisfactory because fretting corrosion took place between the sacrificial element and both mating surfaces of the structural parts so that fretting corrosion continued to take place in the structural parts, bringing about the fatigue strength diminution which was sought to be eliminated.

The use of vibration absorbing materials with sacrificial bushing or bearings was then considered to absorb the dynamic, low amplitude motion which would otherwise be transferred between the mating surfaces of the structural parts to cause fretting corrosion therebetween. The realization that complete isolation of the parent material from intimate contact with its loaded partner led to the introduction of a sacrificial element to absorb the deleterious damage but not transfer through to the crucial structural element. Resiliently mounted bushings are not new; in fact, they are known in U.S. Pat. 2,554,008 to Berger and in British Pat. No. 578,318 to Godfrey et al., but these patents mount their resiliently mounted segmented bushings within a metallic sleeve or carrier which sleeve or carrier is of selected size to be inserted into an aperture in one of the structural parts to be joined. Investigation revealed that the fretting corrosion which was sought to be eliminated actually took place between the sleeve or carrier of the bushing or bearing and the structural part with which it mated. Such patents therefore do not accomplish fretting abatement, in fact, their purpose is to improve and protect the bushing while our purpose is to preserve the structural parts.

In addition, by bonding the sacrificial bushing segments to the structural part by means of a flexible, structural bond, crack propagation between the bushing segments and the parent part can be eliminated if the proper modulus ratio exists between the bond agent and the parent material. If the sacrificial bushing elements were welded to the parent metal as in Vasconi, U.S. Pat. No. 2,821,010, or by brazing as in Edgar, U.S. Pat. No. 2,590,761, any crack which originated in the bushing element would propagate therethrough, through the weld or braze and into the parent metal without retardation.

SUMMARY OF THE INVENTION

A primary object of the present invention is to provide apparatus and method for preventing fretting corrosion between mated structural parts.

In accordance with the present invention, a segmented or split sacrificial bushing or bearing is bonded directly by a flexible bonding agent to one of the structural parts to be joined and is shaped to provide an interrupted bearing surface adapted to mate with the other structural parts to be joined. The term "bushing" will be used hereinafter to describe the sacrificial segment element which is bonded to the structural part but such element could also be considered to be a bearing.

It is still a further object of this invention to teach a fretting corrosion-free joint between load-carrying parts wherein the sole metal-to-metal interface in the joint is between the sacrificial bearing or bushing elements and the connecting element of one of the structural parts to be joined, which sacrificial bushing elements are bonded directly to the connecting element of the other structural element by a resilient adhesive.

It is still a further object of this invention to teach such a fretting corrosion-free joint wherein the bonding material has a shear modulus of elasticity between 200,000 p.s.i. and 300,000 p.s.i. so as to absorb the dynamic, low amplitude relative motion which would otherwise take place between the structural parts so joined to cause fretting corrosion. Such a bonding material prevents the transfer of any crack which might originate in the bushing material from propagating through the bonding material and into the structural part if the primary structure has a modulus of elasticity adequately removed from the bond modulus of elasticity.

In accordance with a further aspect of the present invention, the separations between the segments of the sacrificial bearing or bushing material are selectively positioned so as to be out of alignment with the region of maximum geometric stress concentration factor (SCF) so that the regions of maximum shear stress buildup in the bonding adhesive at the ends of the sacrificial bearing elements are out of alignment with the region of maximum geometric SCF thereby minimizing the possibility of shear failure in the bond.

In accordance with a further aspect of the present invention, fretting is eliminated between the mating surfaces of the joined elements of two structural parts by structurally bonding thin, sacrificial, segmented elements to the connecting surface of one of the structural parts so that the sacrificial elements will bear against and support the connecting surface of the other of the structural parts, and which sacrificial elements are designed with the intent of keeping their vibratory stress content maintained below their fretted endurance limit.

This invention permits fabricating such a fretting corrosion-free joint between structural parts wherein a sacrificial bushing is formed by structurally bonding the individual elements of the sacrificial bushing to one another and to the connecting surface of one of the structural parts to be so joined by means of a resilient bonding material and then machining the surfaces of the bushing elements to form an interrupted bushing surface of selected size so as to properly mate with the connecting surface of the other structural part to be so joined.

BRIEF DESCRIPTION OF THE DRAWINGS

FIG. 1 is a partial showing of a helicopter rotor showing an environment in which the anti-fretting corrosion mechanism is used with the stack bearings between the spindle and the blade sleeve of the rotor and also with the blade flapping hinge.

FIG. 2 is a showing through the hinge pin of a rotor to show anti-fretting corrosion bushings in that environment.

FIG. 3 is a view taken along lines 3—3 of FIG. 2 to show the segmented or split feature of the bushing.

FIG. 4 is a perspective showing of one of the elements of the split bushing.

FIG. 5 is a schematic showing of the pin-loaded lug of the spindle of a helicopter rotor showing the forces and stresses acting thereon.

FIG. 6 is a graph showing the advantage to be gained by the use of our anti-fretting corrosion mechanism with such a pin-loaded lug.

FIG. 7 is a schematic showing of a pin-loaded spindle lug showing the preferred positioning of our segmented bushing elements.

FIG. 8 is a showing of one of the bushing segments illustrated in FIG. 7 to show the stress curve as shear stress is applied thereto when used as part of a pin-loaded lug.

FIG. 9 is a showing of the bonding material positioned between the segmented bushing of FIG. 7 and the pin-loaded lug cylindrical aperture surface, to graphically illustrate the shearing stress buildup in the adhesive or bonding material.

FIG. 10 is an enlarged portion of FIG. 1 showing in greater particularity our anti-fretting corrosion elements in their environment.

FIG. 11 is a slightly reduced showing along line 11—11 of FIG. 1.

FIG. 12 is a showing wherein a pair of anti-fretting corrosion elements are utilized in an environment which would subject two coacting parts to fretting corrosion.

DESCRIPTION OF THE PREFERRED EMBODIMENT

Referring to FIG. 1, we see a portion of the rotor 10 of a modern helicopter which includes hub 12 which has top and bottom plates, the top plate being shown at 14. While the mechanism of top plate 14 only will be described, it should be borne in mind that the bottom plate is spaced therefrom. Top plate 14 includes cylindrical support member 16 which coacts with a corresponding member in the bottom plate (not shown) to present spaced cylindrical supports for universal member 18. Member 18 is basically two crossed cylinders, one of which is element 20 which is pivotally received in aligned cylinder housings, such as 16, of hub 14 to define the lead-lag hinge 21 about lead-lag axis 64 of the rotor head sleeve and spindle assembly 22. The second cylinder 24 of element 18, as best shown in FIG. 2, cooperates with spindle 26 and flapping hinge pin 30 to provide a flapping hinge 25 for sleeve and spindle assembly 22. Universal member 18 is commonly known as vertical hinge.

Spindle 26 includes cylindrical shaft member 32 which is concentrically positioned around blade pitch change or feathering axis 34. Cylindrical sleeve 36 envelops spindle shaft 32 to define annular chamber 38 therebetween. A plurality of stacked anti-friction bearings such as ball bearings 40, 42, 44, 46 and 48 are positioned in annular chamber 38 and serve to support blade sleeve 36 and hence sleeve and spindle assembly 22 for pitch change rotary motion about spindle shaft 32 and pitch change axis 34.

Whenever, for maximum strength-to-weight reasons, spindle shaft 32 and sleeve 36 are made of titanium or one of the other exotic materials, it is desirable to place the sacrificial, segmented, anti-fretting corrosion bushings between shaft 32 and the bearings 40–48 and between spindle 26 and the bearings as shown at 50 and 52, respectively. The construction of elements 50 and 52 will be described in greater particularity hereinafter in connection with FIGS. 10 and 11, which show this second embodiment of our invention.

As best shown in FIGS. 1, 2 and 3, spindle 26 is bifurcated and includes spaced lugs 54 and 56, which include aligned circular apertures or bores 58 and 60 concentric about flapping axis 62, which is perpendicular to lead-lag axis 64. Flapping hinge pin 30 extends along flapping axis 62 and has a cylindrical portion 57 which is received in apertures 58 and 60. Pin 30 is retained with respect to spindle 26 by nut 66, which bears against the outer surface of lug 56 of the spindle and causes pin shoulder 68 to bear against the outside surface of lug 54. Hinge pin 30 also passes through cylindrical support 24 of universal member 18 so as to join blade spindle 26 to the rotor hub 12 and thereby define a blade flapping joint 25 about axis 62. As best shown in FIG. 2, spacer sleeve 70 is concentrically positioned about axis 62 and extends between lugs 54 and 56 to prevent distortion of the lugs upon the tightening of nut 66 on pin 30. Spacer 70 also serves as the inner race of compound roller bearing 72, which includes inner race 70, outer race 74 and two series of rollers 76 and 78. Spacer rings 80 nad 82 extend between bearing 72 and lugs 54 and 56, respectively and cooperate therewith to define annular chambers 84 and 86 which house ring seals 88 and 90.

In addition to anti-fretting corrosion members 92 and 94, it is also preferable to use annular, flat-ring anti-corrosion members 112, 114, 116 and 118 between the side surfaces of lugs 54 and 56 and their mating elements such as pin 30, nut 66, and bearing 72. The details and operation of helicopter rotor 10 depicted in FIGS. 1–3 are described in greater particularity in U.S. Pats. Nos. 3,097,- 701 and 2,925,130 to which reference may be had.

To obtain maximum strength-to-weight, spindle 26 is preferably fabricated of titanium. Because of the dynamic low amplitude vibrations to which the helicopter is subjected, fretting corrosion would occur in lugs 54 and 56 of spindle 26 due to the minute motions which would take place between the cylindrical apertures 58 and 60 of lugs 54 and 56 and the cylindrical portion 57 of pin 30. To prevent this fretting corrosion of lugs 54 and 56, sacrificial anti-fretting corrosion bushings 92 and 94 are positioned within apertures 58 and 60 of lugs 54 and 56 and, in a fashion to be described in greater particularity hereinafter, are bonded directly to lugs 54 and 56 at apertures 58 and 60 by a resilient, structural bonding material.

As best shown in FIG. 3, bushing 94 is segmented and includes four bearing elements 96, 98, 100 and 102 which have gaps 104, 106, 108 and 110 therebetween. The vibratory stress content of the bushing is inversely proportional to the number of discrete segments into which the bushing is split. Four segments are adequate in this configuration.

As best shown in FIG. 4, sacrificial bushing elements, such as 96, may include a first portion 120, which is shaped as a portion of a cylinder and which is to be bonded to the cylindrical apertures 58 and 60, and a second portion 122, which is positioned at right angles to portion 120 and which is shaped as a portion of a flat washer and which is to be bonded to one of the face surfaces of the lugs 54 or 56. It will be obvious that a third bushing portion (not shown) could be provided perpendicular to portion 120 and parallel to portion 122 to be bonded to the opposite face surface of the lugs 54 and 56, if desired. While four segments of the sacrificial anti-fretting corrosion bushing are illustrated in FIG. 3, it will be evident to those skilled in the art that any number of segments could be used; however, if four are used, it is recommended that the individual segments extend to an arc of about 90°, leaving a gap of about .050 therebetween. The sacrificial bushing elements are preferably fabricated of, but not limited to, stainless steel.

Many of the structural, load-carrying parts in a modern helicopter are connected to form a joint therebetween in an environment which subjects these load-carrying structural parts to fretting corrosion due to microscopic, dynamic motion between the mating surfaces of the structural parts. While there are many situations where structural parts are so joined in an environment which produces fretting corrosion, for the purpose of illustrating the deleterious effect of fretting corrosion, the action of the pin-loaded lugs, such as 54 or 56 in spindle 26, will now be described.

The fatigue strength of the pin-loaded lugs, such as 56, is of primary importance in the design of a helicopter rotor system hardware. Methods to increase the fatigue strength of pin-loaded lugs have been tried with varying degrees of success. For example, the bearing surfaces of the lugs have been burnished or shotpeened so as to cold work these surfaces. While this process produces some degree of structural success when the coacting structural parts are made of steel, titanium and possibly other exotic materials, it does not prevent surface deterioration and loss of critical dimensions. In addition, the surfaces of the lug can be overloaded so as to intentionally yield the inner surface thereof in an attempt to increase the fatigue strength thereof, and while this again meets with some degree of success as aforementioned it suffers the surface deterioration as aforementioned. The desirable result which would be obtained by raising the fatigue strength of these lugs would be a weight-saving because lighter structural parts used in such load-carrying joints would be capable of handling the same load environments as do the heavier structures of today. The primary object of the apparatus and method taught herein is to raise the fatigue strength of pin-loaded lugs and other structural, load-carrying parts which bear against one another in a fretting corrosion situation. As described in greater particularity hereinafter, it is our teaching to raise the fatigue strength of lugs and other structural parts so joined by bonding segmented (split) bushings directly to the inside surface of the lug bore 60 with a high strength, structural adhesive. An example of such an adhesive is FM–1000. The shear modulus of elasticity of such an adhesive is between 200,000 and 300,000 p.s.i. and can be used when joining stainless steel and titanium.

As used herein, the term "structural adhesive" means those adhesives that conform to MMM–A–132 and have an ultimate shear strength of about 4000 p.s.i. To assist in understanding how fatigue strength loss is encountered in pin-loaded lugs, a brief description of the fatigue failure process of lugs will now be given by viewing FIG. 5. FIG. 5 shows a pin-loaded lug 56 having cylindrical aperture or bore 60 extending therethrough and having a force P, which is the combination of the steady and vibratory loads acting on the pin which passes through the bore 60 to form a joint therewith, which pin will be attached to other mechanism intended to move with and/ or with respect to lug 56. A stress diagram is superimposed on the schematic of lug 56 in FIG. 5 having an ordinate at line 120 and an abscissa at line 122. The nominal stress, which is equal to force P divided by the lug tension area, which, in turn, is the area on both sides of bore 60 along ordinate 120, is shown at line 124 to be of equal intensity across the lug tension area. It can be shown analytically that for the materials used in helicopter rotor systems, such as steel, titanium and aluminum, the mean endurance limit of the unprotected lug, that is the lug with the bore 60 left just as machined is about 1/20 of the static strength. The static strength of the unprotected lug may be defined as the axial load necessary to cause static rupture by one of the principal modes of failure; i.e., shear tear-out or tension fracture. This factor of 1/20 is made up of two basic factors namely, first, the geometric stress concentration factor and, secondly, the fretting factor. The geometric stress concentration factor, known as SCF, exists because of the shape of the lug and the need for the applied load to change direction. For the particular pin-loaded lug involved, the geometric stress concentration factor is greatest throughout the 30 degrees illustrated in FIG. 5. The fretting factor is caused by microscopic motion of the vibratory loaded pin against the bore 60 of the lug 56 so as to generate a surface damage in bore 60. The form of this damage is a gradually increasing microscopic stress concentration factor that continuously changes the overall stress concentration factor during the fatigue life of the part involved. The fretting damage is predominant in the 30 degree zone shown in FIG. 5, and it will be noted that this is the same region in which the geometric stress concentration factor acts. The depth and coverage of the fretting product grows as cycles build up. The oxide product occupies a greater volume which generates high microscopic pressures.

By viewing FIG. 6 and in particular curve 1 thereof, we see the strength of a lug which has an unprotected bore. It will be noted in curve 1 of FIG. 6 that the load required to break the lug decreases as the cycles applied to the lug are increased and that the lug is at its weakest at $10^7$ to $10^8$ cycles and above. It can be shown that if we can protect the surface 60 of bore 56 from this fretting action so that only geometric stress concentration factors are applied to the lug, the resulting strength curve would be shown in curve 2 and it will be noted that at all cycles, but in particular at the higher cycles just mentioned, the strength of the lug is substantially increased. Accordingly, by protecting the surface of the bore 60 of lug 56 from fretting corrosion, the fatigue strength of the lug can be increased.

The teaching herein is to protect bore surface 60 of lug 56 from fretting corrosion, and thereby increase the fatigue strength of the lug, by structurally bonding segmented sacrificial bushings directly to bore surface 60 by means of some high strength, flexible bonding material. By the use of such a sacrificial, segmented bushing so bonded, we have demonstrated that the lug fatigue strength can be changed from curve 1 to curve 2 in FIG. 6.

The specific purpose of the bonded bushing is to protect the lug bore from the deleterious effect of fretting.

It has also been determined that the bonding material which bonds the split bushing directly to the lug bore can also serve to prevent the propogation of any fatigue crack which might take place in the bushing from propagating into the parent member, namely the lug. Should a crack propagate through the wall of the bushing segment, the bonding material would shear or otherwise be displaced to absorb the energy of the crack and thereby prevent the crack energy from passing through the bonding material and into the parent material, namely the lug. If the bonding material did not perform this energy absorbing function, cracks would propagate from the bushing, through the bonding material and into the lug. We have found in this connection that the orientation of the split segments of the bushing is important. This preferred segment orientation is best illustrated and explained by viewing FIGS. 7, 8 and 9.

By viewing FIG. 7 we see that the peak stress and strain in the bore of the lug occurs at point $a$. Point $a$ is also the point of maximum tension stress in the segment and is best illustrated in FIG. 8 to be maximum along line 130. The shear stress buildup in the adhesive is shown diagramatically in FIG. 9 to be minimum at point $a$, the midpoint of the bond material along the bushing segment, and maximum at the ends of the bond material in radial alignment with the ends of the bushings segments. So that these maximum stress regions are not in alignment, it is preferable to position the segments so that their midpoint, which is their minimum shear stress buildup area, is in alignment with point $a$, the peak stress (strain) region of the lug. In this manner, the bonding material is not subjected to maximum stress and therefore minimizes possibility of cracking the bond. In other words, in order to minimize fatigue cracks in the bond line, the shear stress in the bond line must be minimized. This is done by avoiding aligning the ends of the bushing segments with the point of maximum bore fibre strain, $a$. This puts zero shear strain in the bond at the maximum fibre strain point of the lug. Accordingly, if a fatigue crack either occurs in the bond material or is transmitted thereinto from the segment material, such crack will be unlikely to propagate into the parent material of the bore. As shown in FIG. 7, it is preferable that the bonding material be used so that its thickness is approximately .005 inch thick and so that its modulus of elasticity is substantially lower than that of the titanium of the lug. For example, while the Young's modulus of elasticity of the titanium of the lug is $16 \times 10^6$ p.s.i., the shear modulus of elasticity of the preferred bond material, such as FM–1000, ranges between 200,000 and 300,000 p.s.i. The bushing is fabricated initially as one-piece with an outer diameter that will conform to the diameter of the lug bore 60 after the bonding material has been laid into the bore 60. The inside diameter of the bushing will be such that after bonding is accomplished, material will be available to be machined to a final bore diameter. It should be stated here, that under a less critical dimensional application, the final bore diameter need not be machined after bonding but can be a function of the tolerances prior to bonding. Prior to assembly the one-piece bushing is split into segments. The purpose of segmenting is twofold: (1) it is necessary to segment in order to apply and maintain radial pressure to the bond during curing and, (2) the segmenting minimizes the stress in the bushing. The bond material, e.g. FM–1000, is manufactured in strip form. This bond material is laid into the bore 60. The bushing segments are laid onto the bond material, orienting the splits in accordance with aforementioned criteria. A method of providing radial pressure during the bond curing cycle must be provided, e.g. a spring loaded expandable tool. The whole assembly is then placed in a furnace then cured at 340° Fahrenheit for two hours. The bonding procedure is concisely defined in MIL–A–9067 Adhesive Bonding, Process and Inspection Requirements Bore.

It is an important teaching of this invention that the adhesive material be applied directly to the parent, structural, load-carrying member so as to protect that member from fretting corrosion. If the sacrificial bushing were bonded by bonded material to a cylindrical metallic carrier and then this carrier were received in the bore of the parent structural part such as bore 60 of lug 56, the fretting corrosion which is eliminated by the direct bonding to the parent material would, in fact, occur between the metallic carrier and the surface 60 of the parent material.

FIG. 10 is an enlarged showing of one of the bearings 42 of the row of stack bearings 40–48 which are positioned in the annular cavity 38 defined between spindle shaft 32 and blade sleeve 36. These parts thereby cooperate to support sleeve and spindle assembly 22 from hub 14 and to permit sleeve 36 to rotate about spindle 26 and feathering axis 34 so as to change pitch of the rotor blades, (not shown), as shown in FIG. 11, sacrifical split bushing units 52 and 50 are positioned between titanium sleeve 36 and the stack bearings 40–46 and titanium spindle shaft 32 and the bearings 40–46, respectively. Since it is the titanium parts which are to be protected from fretting corrosion, the sacrificial bushing segments 52 and 50 are positioned adjacent the races of the bearings 40–46 and are structurally bonded by appropriate bonding material 208 and 210 to the inner diameter of titanium sleeve 36 and the outer diameter of titanium shaft 32, respectively. In this fashion, as is the case in the pin-loaded lug environment described in connection with FIGS. 2 and 5, the sacrificial bushing elements constitute the only metal-to-metal interface in the connection or joint involved.

As best shown in FIG. 11, sacrificial bushing 52 is preferably segmented into segments 220, 222, 224 and 226 while sacrificial bushing 50 is preferably segmented into segments 230, 232, 234 and 236. In addition to segmenting the bushings axially along axis 34 into several segments for reasons of minimizing bond shear stress and segment stress and to permit installation and structural bonding of the bushing, it is also necessary for the same stress reasons to split the bushings circumferentially perpendicular to axis 34.

In instances where a joint is being formed between two metals made of the modern exotic materials such as titanium, such that both such titanium parts would be subjected to fretting corrosion, a construction of the type shown in FIG. 12 could be used. In this construction, a titanium anti-friction bearing 300 is positioned concentrically about axis 302 between outer cylindrical titanium shaft 304 and inner cylindrical titanium shaft 306. A first segmented ring bushing 308 is structurally bonded by appropriate bonding material of the type previously described and shown at 310 to the inner surface 312 of shaft 304. A second segmented sacrificial bushing ring 314 is sized to mate with and bear against the first sacrificial bushing ring 308 and is structurally bonded by appropriate bonding material shown at 316 to the outer surface 318 of the outer race 320 of anti-friction bearing 300. In similar fashion, a third segmented sacrificial bushing ring 322 is bonded by appropriate bonding material shown at 324 to the inner surface 326 of shaft 306. Sacrificial and segmented bushing ring 330, which is shaped to mate with and bear against sacrificial bushing 322 is bonded by appropriate bonding material 332 to the inner surface 334 of the inner race 336 of bearing 300. With this construction there is no titanium surface constituting a part of any metal-to-metal interface, thereby avoiding fretting corrosion and the attendant fatigue strength reduction to any titanium part. Any fretting which will occur in this construction will occur between the mating sacrificial bushings such as 308 and 314 and mating sacrificial bushings 330 and 322. These bushings are easily replaceable and inexpensive to manufacture by comparison to the cost of the titanium shafts 304 and 306 and the titanium bearing races 320 and 336.

We claim:

1. An apparatus subject to fretting damage between mating parts including:
   (1) a first load-carrying structural part having a mating surface of preselected shape,
   (2) a second load-carrying structural part having a mating surface of the same general shape as said mating surface of said first part and spaced therefrom to define a chamber therebetween,
   (3) means supporting said parts so that relative motion of an amplitude and frequency to cause fretting therebetween would normally occur during operation if said parts were in mating contact,
   (4) a split bushing including a plurality of spaced split bushing members located in said chamber between said parts and each including a bearing surface mating with the mating surface of one of said parts and a second surface structurally bonded by a structural adhesive to said mating surface of the other of said parts to thereby support said parts in load carrying relation without fretting damage therebetween.

2. Apparatus according to claim 1 wherein said mating surface of one of said parts defines a cylindrical aperture and wherein said mating surface of the other of said parts is in cylindrical form.

3. Apparatus according to claim 1 wherein said bonding material has a shear modulus of elasticity between 200,000 and 300,000 p.s.i.

4. Apparatus according to claim 1 wherein said parts are shaped to constitute a joint and wherein said bearing surfaces of said bushing members constitute the sole metal-to-metal interface in said joint.

5. Apparatus according to claim 1 wherein said parts are made of titanium.

6. Apparatus according to claim 4 wherein said joint is cylindrical in shape and wherein said bushing members are spaced both axially along and circumferentially about the joint axis.

7. Apparatus according to claim 1 wherein the spaces between the spaced bushing members are selectively positioned to be out of alignment with the region of maximum geometric stress concentration created by the load being transferred between said first and second parts.

8. An apparatus subject to fretting damage to mating parts including:
   (1) a first load-carrying structural part having a mating surface of preselected shape,
   (2) a second load-carrying structural part having a mating surface of the same general shape as said mating surface of said first part and spaced therefrom to define a chamber therebetween,
   (3) means supporting said parts so that relative motion of an amplitude and frequency to cause fretting therebetween would normally occur during operation if said parts were in mating contact,
   (4) two split bushings positioned in motion engagement to each other in said chamber,
   (5) and structural adhesive bonding one of said split bushings to the mating surface of one of said parts and the other of said split bushings to the mating surface of the other of said parts.

References Cited

UNITED STATES PATENTS

| | | | |
|---|---|---|---|
| 1,989,116 | 1/1935 | Strauss | 308—26 |
| 2,007,152 | 7/1935 | Allee | 308—184 |
| 2,240,285 | 4/1941 | Chamberlin | 308—184 |
| 2,283,440 | 5/1942 | Hufferd | 308—26 X |
| 2,487,653 | 11/1949 | Heintze | 308—26 X |
| 2,583,019 | 1/1952 | Saywell | 277—184 |
| 2,777,402 | 1/1957 | Rossell | 105—224 |
| 3,022,685 | 2/1962 | Aramacost | 308—238 X |
| 3,105,252 | 10/1963 | Milk | 14—16 |
| 3,311,425 | 3/1967 | Schraub | 308—3 |
| 3,365,032 | 1/1968 | Gorndt | 308—184 |
| 3,378,316 | 4/1968 | Hotine | 308—238 |
| 3,428,372 | 2/1969 | Keller | 308—184 |
| 2,934,480 | 4/1960 | Slomin | 308—241 |
| 3,000,657 | 9/1961 | Boschi | 308—26 |
| 3,009,746 | 11/1961 | Haushalter | 308—26 |
| 3,071,981 | 1/1963 | Kuntzmann | 308—241 |
| 3,127,224 | 3/1964 | Owens | 308—241 |
| 3,243,236 | 3/1966 | Graham | 308—3 |
| 3,387,839 | 6/1968 | Miller | 308—237 |
| 3,237,698 | 3/1966 | Gandy | 170—160.23 |
| 3,302,988 | 2/1967 | Senter | 308—238 |
| 3,363,300 | 1/1968 | Stec | 29—149.5 |

FOREIGN PATENTS

| | | |
|---|---|---|
| 445,941 | 1/1948 | Canada. |
| 961,824 | 6/1964 | Great Britain. |
| 979,599 | 1/1965 | Great Britain. |
| 962,220 | 7/1964 | Great Britain. |
| 525,432 | 8/1940 | Great Britain. |
| 666,805 | 2/1952 | Great Britain. |

MANUEL A. ANTONAKAS, Primary Examiner

U.S. Cl. X.R.

308—238; 416—205